(12) United States Patent
Koenigs et al.

(10) Patent No.: US 12,480,065 B2
(45) Date of Patent: Nov. 25, 2025

(54) DRAG REDUCING AGENT

(71) Applicant: Dow Global Technologies LLC, Midland, MI (US)

(72) Inventors: David Koenigs, Pearland, TX (US); Sean W. Ewart, Pearland, TX (US); Troy E. Knight, Missouri City, TX (US); Pritish M. Kamat, Pearland, TX (US); Lixin Sun, Sugar Land, TX (US); Roger L Kuhlman, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 561 days.

(21) Appl. No.: 17/914,564

(22) PCT Filed: Mar. 26, 2021

(86) PCT No.: PCT/US2021/024460
§ 371 (c)(1),
(2) Date: Sep. 26, 2022

(87) PCT Pub. No.: WO2021/202302
PCT Pub. Date: Oct. 7, 2021

(65) Prior Publication Data
US 2023/0159844 A1    May 25, 2023

Related U.S. Application Data (60) Provisional application No. 63/002,540, filed on Mar. 31, 2020.

(51) Int. Cl.
| | | |
|---|---|---|
| *C09K 8/12* | (2006.01) | |
| *C10M 107/10* | (2006.01) | |
| *C10M 125/04* | (2006.01) | |
| *C10N 10/06* | (2006.01) | |
| *C10N 10/08* | (2006.01) | |

(52) U.S. Cl.
CPC ........ *C10M 107/10* (2013.01); *C10M 125/04* (2013.01); *C10M 2201/06* (2013.01); *C10M 2205/0285* (2013.01); *C10N 2010/06* (2013.01); *C10N 2010/08* (2013.01)

(58) Field of Classification Search
CPC ...................................................... C09K 8/12
See application file for complete search history.

(56) References Cited

U.S. PATENT DOCUMENTS

| | | |
|---|---|---|
| 4,289,679 A | 9/1981 | Mack |
| 4,358,572 A | 11/1982 | Mack et al. |
| 4,493,903 A | 1/1985 | Mack |
| 4,647,633 A | 3/1987 | Kostelnik |
| 5,912,316 A | 6/1999 | Nguyen et al. |
| 6,015,779 A | 1/2000 | Eaton et al. |
| 6,232,421 B1 | 5/2001 | Fujita et al. |
| 6,414,094 B2 | 7/2002 | Fujita et al. |
| 6,596,832 B2 | 7/2003 | Johnston et al. |
| 6,730,750 B2 | 5/2004 | Eaton et al. |
| 8,106,114 B2 | 1/2012 | Eaton et al. |
| 8,957,171 B2 | 2/2015 | Giesbrecht et al. |
| 9,546,231 B2 | 1/2017 | Ghosh et al. |
| 9,969,826 B2 | 5/2018 | Atiqullah et al. |
| 10,836,848 B2 | 11/2020 | Paley et al. |
| 2002/0173569 A1 | 11/2002 | Karhu et al. |
| 2003/0065055 A1 | 4/2003 | Johnston et al. |
| 2003/0069330 A1 | 4/2003 | Johnston et al. |
| 2009/0227729 A1 | 9/2009 | Burden et al. |
| 2014/0330056 A1* | 11/2014 | Klosin .................... C08F 10/00 585/17 |
| 2015/0183901 A1 | 7/2015 | Ghosh et al. |
| 2015/0291713 A1 | 10/2015 | Klosin et al. |
| 2018/0258266 A1 | 9/2018 | Hu et al. |

FOREIGN PATENT DOCUMENTS

| | | |
|---|---|---|
| CN | 1500814 A | 6/2004 |
| CN | 1527846 A | 9/2004 |
| CN | 102898554 A | 1/2013 |
| CN | 103030740 A | 4/2013 |
| CN | 103030855 A | 4/2013 |
| CN | 103626892 A | 3/2014 |
| CN | 105440193 A | 3/2016 |
| CN | 106632784 A | 5/2017 |
| CN | 109593153 A | 4/2019 |
| JP | H08/301919 A | 11/1996 |
| WO | 02/034802 A1 | 5/2002 |

OTHER PUBLICATIONS

Suzuki, N., et al., Marcomolecules, vol. 33, No. 3, Feb. 2000, p. 754-759.
Ameri David, R.L., Associative Polymers as Antimisting Agents and Other Functional Materials via Thiolene Coupling, Jun. 4, 2008, retrieved from internet [Dec. 7, 2012] http://thesis.library.caltech.edu/2173.

* cited by examiner

*Primary Examiner* — Deve V Hall (74) *Attorney, Agent, or Firm* — Boyle Fredrickson S.C.

(57) ABSTRACT

The present disclosure provides a drag reducing agent. In an embodiment, the drag reducing agent includes a polymer and a liquid carrier. The polymer is composed of one or more $C_6$-$C_{14}$ α-olefin monomers. The polymer includes a residual amount of zirconium. The polymer has an absolute weight average molecular weight ($Mw_{(Abs)}$) greater than 1,300,000 g/mol and a ($Mw_{(Abs)}/Mn_{(Abs)}$) from 1.3 to 3.0.

8 Claims, 3 Drawing Sheets

DRAG REDUCING AGENT

BACKGROUND

Where fluids are transported over long distances, such as in oil pipelines and other hydrocarbon liquid pipelines, substantial turbulence and wall friction is created. These friction losses result in inefficiencies that increase equipment and operations costs. Known are drag reducing agents (DRAs) that reduce the turbulence-mediated friction and eddies, which, in turn, decreases friction losses and pressure drop in hydrocarbon liquid pipelines. Drag reducing agents are typically ultra-high molecular weight polymers (greater than 5,000,000 g/mol) with the ability to dissolve in a hydrocarbon under turbulent flow.

Ziegler-Natta catalyst systems are used to produce conventional DRAs. However, the production of ultra-high molecular weight polymers by way of Ziegler-Natta catalysis is subject to several drawbacks. Ziegler-Natta catalysis for ultra-high molecular weight polymers is inefficient as polymerization temperatures are typically low and reaction times are long in order to produce the high molecular weight polymer needed for the application. Furthermore the polymer is typically broad in molecular weight distribution and final polymer properties are often difficult to control.

The art recognizes the need for drag reduction agents produced by way other than Ziegler-Natta catalysis. Further recognized is the need for high-molecular weight polymers effective for drag reduction with narrow molecular weight distribution.

SUMMARY

The present disclosure provides a drag reducing agent. In an embodiment, the drag reducing agent includes a polymer and a liquid carrier. The polymer is composed of one or more $C_6$-$C_{14}$ α-olefin monomers. The polymer includes a residual amount of zirconium. The polymer has an absolute weight average molecular weight ($Mw_{(Abs)}$) greater than 1,300,000 g/mol and a $Mw_{(Abs)}/Mn_{(Abs)}$ from 1.3 to 3.0.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., the range 1-7 above includes subranges of 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

The term "1-hexene," as used herein, is an unsaturated hydrocarbon α-olefin having the molecular formula $C_6H_{12}$ and the unsaturation is at the alpha position. 1-hexene has the molecular Structure (A) as shown below.

Structure (A)

A "hexene-based polymer" is a polymer that contains more than 50 weight percent (wt %) polymerized hexene monomer (based on the total amount of polymerizable monomers) and, optionally, may contain at least one comonomer different than hexene (such as one selected from $C_{2-7}$ α-olefin and/or $C_{9-42}$ α-olefin. Hexene-based polymer includes hexene homopolymer, and hexene copolymer (meaning units derived from hexene and one or more comonomers). The terms "hexene-based polymer" and "polyhexene" may be used interchangeably.

The term "1-octene," as used herein, is an unsaturated hydrocarbon α-olefin having the molecular formula $C_8H_{16}$ and the unsaturation is at the alpha position. 1-octene has the molecular Structure (B) as shown below.

Structure (B)

The term "isomer of octene," as used herein, is an unsaturated hydrocarbon having the molecular formula $C_8H_{16}$, and the unsaturation (the double bond) is not at the alpha position. In other words, the term "isomer of octene" is any octene to the exclusion of 1-octene. Nonlimiting examples of isomers of octene include cis-2-octene, trans-2-octene, cis-3-octene, trans-3-octene, and combinations thereof as well as cis-4-octene, trans-4-octene, branched octene isomers and combinations of thereof.

An "octene-based polymer" is a polymer that contains more than 50 weight percent (wt %) polymerized octene monomer (based on the total amount of polymerizable monomers) and, optionally, may contain at least one comonomer different than octene (such as one selected from $C_{2-7}$ α-olefin and/or $C_{9-12}$ α-olefin. Octene-based polymer includes octene homopolymer, and octene copolymer (meaning units derived from octene and one or more comonomers). The terms "octene-based polymer" and "polyoctene" may be used interchangeably.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "octene/α-olefin polymer" are indicative of copolymer as described above prepared from polymerizing ethylene or octene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

Test Methods

Gel Permeation Chromatography (GPC)

The chromatographic system consisted of a PolymerChar GPC-IR (Valencia, Spain) high temperature GPC chromatograph equipped with an internal IR5 infra-red detector (IR5). The autosampler oven compartment was set at 160° Celsius and the column compartment was set at 150° Celsius. The columns used were 4 Agilent "Mixed A" 30 cm 20-micron linear mixed-bed columns and a 20-um pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. A third-order polynomial was used to fit the respective polystyrene-equivalent calibration points.

The total plate count of the GPC column set was performed with decane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{Peak\ Max})}{\text{Peak Width at } \frac{1}{2} \text{height}} \right)^2 \quad (EQ\ 2)$$

wherein RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ Max})}{(RV_{Peak\ Max} - \text{Front Peak } RV_{one\ tenth\ height})} \quad (EQ\ 3)$$

wherein RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 18,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polystyrene equivalent molecular weight obtained from the narrow standard calibration curve for the point (i) from Equation 1.

$$Mn_{(GPC)} = \frac{\sum_i IR_i}{\sum_i (IR_i/M_{polyethylene_i})} \quad (EQ\ 4)$$

$$Mw_{(GPC)} = \frac{\sum_i (IR_i * M_{polyethylene_i})}{\sum_i IR_i} \quad (EQ\ 5)$$

-continued $$Mz_{(GPC)} = \frac{\sum_i (IR_i * M_{polyethylene_i}^2)}{\sum_i (IR_i * M_{polyethylene_i})} \quad (EQ\ 6)$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate$_{(nominal)}$) for each sample by RV alignment of the respective decane peak within the sample (RV$_{(FM\ Sample)}$) to that of the decane peak within the narrow standards calibration (RV$_{(FM\ Calibrated)}$). Any changes in the time of the decane marker peak are then assumed to be related to a linear-shift in flowrate (Flowrate$_{(effective)}$) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−1% of the nominal flowrate.

Flowrate$_{(effective)}$=Flowrate$_{(nominal)}$*(RV$_{(FM\ Calibrated)}$/RV$_{(FM\ Sample)}$)  (EQ7)

Triple Detector GPC (TDGPC)

The chromatographic system, run conditions, column set, column calibration and calculation conventional molecular weight moments and the distribution were performed according to the method described in Gel Permeation Chromatography (GPC).

For the determination of the viscometer and light scattering detector offsets from the IR5 detector, the Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard (Mw/Mn>3) to the narrow standard column calibration results from the narrow standards calibration curve using PolymerChar GPCOne™ Software.

The absolute molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, NY (1987)) using PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight. The calculated molecular weights (using GPCOne™) were obtained using a light scattering constant, derived from one or more of the polyethylene standards mentioned below, and a refractive index concentration coefficient, dn/dc, of 0.104. Generally, the mass detector response (IR5) and the light scattering constant (determined using GPCOne™) should be determined from a linear polyethylene standard with a molecular weight of about 120,000 g/mole. The viscometer calibration (determined using GPCOne™) can be accomplished using the methods described by the manufacturer, or, alternatively, by using the published values of suitable linear standards. A viscometer constant (obtained using GPCOne™) is calculated which relates specific viscosity area (DV) and injected mass for the calibration standard to its intrinsic viscosity. The chromatographic concentrations are assumed low enough to eliminate addressing 2nd viral coefficient effects (concentration effects on molecular weight).

The absolute weight average molecular weight (Mw$_{(Abs)}$) is obtained (using GPCOne™) from the Area of the Light Scattering (LS) integrated chromatogram (factored by the light scattering constant) divided by the mass recovered from the mass constant and the mass detector (IR5) area. The molecular weight and intrinsic viscosity responses are linearly extrapolated at chromatographic ends where signal to noise becomes low (using GPCOne™) Other respective moments, Mn$_{(Abs)}$ and Mz$_{(Abs)}$ are be calculated according to equations 8-9 as follows:

$$Mn_{(Abs)} = \frac{\sum_i IR_i}{\sum_i (IR_i/M_{Absolute_i})} \quad (EQ\ 8)$$

$$Mz_{(Abs)} = \frac{\sum_i (IR_i * M_{Absolute_i}^2)}{\sum_i (IR_i * M_{Absolute_i})} \quad (EQ\ 9)$$

Residual amount of catalyst metal. A "residual amount" of catalyst metal (Ti, Hf, Zr, and Ge) is from 0 ppm, or greater than 0 ppm to less than 300 ppm, and was determined by mass balance based on added catalyst and the amount of polymer formed during reaction. Results are reported in parts per million (ppm).

Viscosity. Viscosity was measured using an Anton Paar MCR102 equipped with a CC27 cylinder measuring system and a C-ETD300 heating system using a viscosity steady state method at shear rates of 0.01-100 l/second. Approximately 20 ml of sample is added to the measuring cup and then heated to 100° C. The measuring system is then lowered into the sample until it has reached 0.0 mm. This is done over a period of time, so that the force does not reach over 15 Newtons (N). Once the measuring system has reached 0.0 mm the sample along with the measuring system is held at 100° C. for 10 minutes to allow the temperature to equilibrate. Results are reported in millipascal second (m-Pas).

DETAILED DESCRIPTION

The present disclosure provides a drag reducing agent. In an embodiment, the drag reducing agent includes a polymer composed of one or more $C_6$-$C_{14}$ α-olefin monomers. The polymer includes a residual amount of zirconium, and the polymer has an absolute weight average molecular weight (Mw$_{(Abs)}$) greater than 1,300,000 g/mol and a Mw$_{(Abs)}$/Mn$_{(Abs)}$ from 1.3 to 3.0. The drag reducing agent further includes a liquid carrier.

A "drag reducing agent" (or "DRA"), as used herein, is composition that reduces the friction loss that results from the turbulent flow of a fluid. The drag reducing agent is a polymer, copolymer, or terpolymer composed of one or more $C_6$-$C_{14}$ α-olefin monomers; the polymer dispersed in, or otherwise dissolved in, the liquid carrier. Nonlimiting examples of suitable $C_6$-$C_{14}$ α-olefin monomers include 1-hexene, 1-heptene, 1-octene, 1-nonene, 1-decene, 1-dodecene, 1-tetradecene, and combinations thereof.

1. Polymer Composed of One or More $C_6$-$C_{14}$ α-Olefin Monomers

The one or more $C_6$-$C_{14}$ α-olefin monomers are polymerized under polymerization conditions, in the presence of a bis-biphenylphenoxy catalyst, to form a homopolymer, a copolymer, or a terpolymer. As used herein, "polymerization conditions," are temperature, pressure, reactant concentrations, liquid carrier selection, chain transfer agent (CTA), reactant mixing/addition parameters, and other conditions within a polymerization reactor that promote reaction between the reagents and formation of the resultant polymer product, namely homopolymer with one monomer selected from $C_6$-$C_{14}$ α-olefin, a copolymer with two monomers selected from $C_6$-$C_{14}$ α-olefin, or a terpolymer with three monomers selected from $C_6$-$C_{14}$ α-olefin. Polymerization may be conducted in a tubular reactor, in a stirred autoclave reactor, a continuous stirred tank reactor, a gas phase polymerization reactor, a slurry phase polymerization reactor, a loop reactor, an isothermal reactor, a fluidized bed gas phase reactor and combinations thereof in a batch process or a continuous process.

The one or more $C_6$-$C_{14}$ α-olefin monomers are contacted with a bis-biphenylphenoxy catalyst (or interchangeably referred to as "BBP") under polymerization conditions. The bis-biphenylphenoxy catalyst is a metal-ligand complex with a structure as shown in formula (I) below:

formula (I)

wherein

M is a metal selected from zirconium or hafnium, the metal being in a formal oxidation state of +2, +3, or +4;

n is an integer of from 0 to 3, and wherein when n is 0, X is absent; and each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (I) is, overall, neutral; and each Z independently is O, S, N($C_1$-$C_{40}$)hydrocarbyl, or P($C_1$-$C_{40}$)hydrocarbyl; and O is O (an oxygen atom);

L is ($C_1$-$C_{40}$)hydrocarbylene or ($C_1$-$C_{40}$)heterohydrocarbylene, wherein the ($C_1$-$C_{40}$)hydrocarbylene has a portion that comprises a 1-carbon atom to 10-carbon atom linker backbone linking the two Z groups in formula (I) (to which L is bonded) or the ($C_1$-$C_{40}$)heterohydrocarbylene has a portion that comprises a 1-atom to 10-atom linker backbone linking the two Z groups in formula (I), wherein each of the 1 to 10 atoms of the 1-atom to 10-atom linker backbone of the ($C_1$-$C_{40}$) heterohydrocarbylene independently is a carbon atom or heteroatom, wherein each heteroatom independently is O, S, S(O), S(O)$_2$, Si($R^C$)$_2$, Ge($R^C$)$_2$, P($R^C$), or N($R^C$), wherein independently each $R^C$ is ($C_1$-$C_{30}$) hydrocarbyl or ($C_1$-$C_{30}$) heterohydrocarbyl; and each $R^{1-16}$ is selected from ($C_1$-$C_{40}$)hydrocarbyl, ($C_1$-$C_{40}$) heterohydrocarbyl, Si($R^C$)$_3$, Ge($R^C$)$_3$, P($R^C$)$_2$, N($R^C$)$_2$, O$R^C$, S$R^C$, NO$_2$, CN, CF$_3$, $R^C$S(O), $R^C$S(O)$_2$, ($R^C$)$_2$C=N, $R^C$C(O)O, $R^C$OC(O), $R^C$C(O)N(R), ($R^C$)$_2$NC (O), halogen atom, hydrogen atom, and combinations thereof.

The bis-biphenylphenoxy catalyst with structure of formula (I) may be rendered catalytically active by contacting the metal-ligand complex to, or combining the metal-ligand complex with, an activating co-catalyst.

Nonlimiting examples of suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, tri-isobutylaluminum-modified methylalumoxane, and isobutylalumoxane.

Nonlimiting examples of suitable Lewis acid activators (co-catalysts) include Group 13 metal compounds containing from 1 to 3 ($C_1$-$C_{20}$)hydrocarbyl substituents as described herein. In one embodiment, Group 13 metal compounds are tri(($C_1$-$C_{20}$)hydrocarbyl)-substituted-aluminum, tri(($C_1$-$C_{20}$)hydrocarbyl)-boron compounds, tri(($C_1$-$C_{10}$)alkyl)aluminum, tri(($C_6$-$C_{18}$)aryl)boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tetrakis(($C_1$-$C_{20}$)hydrocarbyl borate or a tri(($C_1$-$C_{20}$)hydrocarbyl)ammonium tetrakis(($C_1$-$C_{20}$)hydrocarbyl)borate (e.g. bis(octadecyl)methylammonium tetrakis(pentafluorophenyl)borate). As used herein, the term "ammonium" means a nitrogen cation that is a (($C_1$-$C_{20}$) hydrocarbylN(H)$_3$+, or N(H)$_4$+, wherein each ($C_1$-$C_{20}$)hydrocarbyl, when two or more are present, may be the same or different.

Nonlimiting examples of combinations of neutral Lewis acid activators (co-catalysts) include mixtures comprising a combination of a tri(($C_1$-$C_4$)alkyl)aluminum and a halogenated tri(($C_6$-$C_{18}$)aryl)boron compound, especially a tris (pentafluorophenyl)borane. Other embodiments are combinations of such neutral Lewis acid mixtures with a polymeric or oligomeric alumoxane, and combinations of a single neutral Lewis acid, especially tris(pentafluorophenyl) borane with a polymeric or oligomeric alumoxane. Ratios of numbers of moles of (metal-ligand complex):(tris(pentafluoro-phenylborane):(alumoxane) [e.g., (Group 4 metal-ligand complex):(tris(pentafluoro-phenylborane):(alumoxane)] are from 1:1:1 to 1:10:100, in other embodiments, from 1:1:1.5 to 1:5:30.

The bis-biphenylphenoxy catalyst with structure of formula (I) may be activated to form an active catalyst composition by combination with one or more co-catalysts, for example, a cation forming co-catalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to: modified methyl aluminoxane (MMAO), bis(hydrogenated tallow alkyl)methyl tetrakis(pentafluorophenyl)borate(1<->) amine (i.e. [HNMe($C_{18}H_{37}$)$_2$][B($C_6F_5$)$_4$]), and combinations of both.

One or more of the foregoing activating co-catalysts are used in combination with each other. In an embodiment, the co-catalyst is a mixture of a tri(($C_1$-$C_4$)hydrocarbyl)aluminum, tri(($C_1$-$C_4$)hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris (pentafluorophenyl)borane alone is used as the activating co-catalyst, in some other embodiments, the number of moles of the tris(pentafluorophenyl)borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

In an embodiment, the bis-biphenylphenoxy catalyst with structure of formula (I) includes the metal M that is zirconium.

Polymerization includes contacting one or more $C_6$-$C_{14}$ α-olefin monomers under polymerization conditions with the bis-biphenylphenoxy catalyst of formula (I), and forming a polymer composed of one or more $C_6$-$C_{14}$ α-olefin monomers. The polymer can be a homopolymer of one monomer selected from $C_6$-$C_{14}$ α-olefin (hereafter "a $C_6$-$C_{14}$ α-olefin homopolymer"), a copolymer with two monomers selected from $C_6$-$C_{14}$ α-olefin (hereafter "a $C_6$-$C_{14}$ α-olefin copolymer"), or a terpolymer with three monomers selected from $C_6$-$C_{14}$ α-olefin (hereafter "a $C_6$-$C_{14}$ α-olefin terpolymer"). The polymer (i.e., the $C_6$-$C_{14}$ α-olefin homopolymer, the $C_6$-$C_{14}$ α-olefin copolymer, or the $C_6$-$C_{14}$ α-olefin terpolymer) contains a residual amount of zirconium or hafnium and has an absolute weight average molecular weight ($Mw_{(Abs)}$) greater than 1,300,000 g/mol and a $Mw_{(Abs)}/Mn_{(Abs)}$ from 1.3 to 3.0.

The polymer (i.e., the $C_6$-$C_{14}$ α-olefin homopolymer, the $C_6$-$C_{14}$ α-olefin copolymer, or the $C_6$-$C_{14}$ α-olefin terpolymer) includes a residual amount of hafnium or zirconium, or from greater than 0 ppm to 300 ppm hafnium or zirconium.

In an embodiment, the bis-biphenylphenoxy catalyst is a metal-ligand complex having the structure formula (V) below:

formula (V)

wherein Ge is germanium, Me is a methyl group, tBu is a t-butyl group, and iPr is an isopropyl group. Polymerization conditions include contacting one or more $C_6$-$C_{14}$ α-olefins under polymerization conditions with the bis-biphenylphenoxy catalyst of formula (V), and forming a polymer (i.e., a $C_6$-$C_{14}$ α-olefin homopolymer, a $C_6$-$C_{14}$ α-olefin copolymer, or a $C_6$-$C_{14}$ α-olefin terpolymer). The polymer (i.e., the $C_6$-$C_{14}$ α-olefin homopolymer, the $C_6$-$C_{14}$ α-olefin copolymer, or the $C_6$-$C_{14}$ α-olefin terpolymer) has one, some, or all of the following properties:

(i) a $Mw_{(Abs)}$ from greater than 1,300,000 g/mol to 12,000,000 g/mol, or from 1,400,000 g/mol to 10,000,000 g/mol, or from 1,400,000 g/mol to 9,000,000 g/mol, or from 1,500,000 g/mol to 8,000,000 g/mol; and/or (ii) a $Mw_{(Abs)}/Mn_{(Abs)}$ from 1.3 to 3.0, or from 1.4 to 2.9, or from 1.5 to 2.8, or from 2.1 to 2.7, or from 2.2 to 2.6; and/or (iii) a residual amount of zirconium, or from greater than 0 ppm, or 1 ppm to less than 300 ppm, or from 10 ppm to 200 ppm, or from 15 ppm to 180 ppm, or from 20 ppm to 170 ppm, or from 30 ppm to 160 ppm zirconium; and/or (iv) a residual amount of germanium, or from greater than 0 ppm, or 1 ppm to less than 300 ppm, or from 10 ppm to 200 ppm, or from 12 ppm to 150 ppm, or from 14 ppm to 130 ppm, or from 14 ppm to 125 ppm germanium.

In an embodiment, the bis-biphenylphenoxy catalyst is a metal-ligand complex having the structure formula (VI) below:

formula (VI)

wherein Me is a methyl group, tBu is a t-butyl group. Polymerization conditions include contacting one or more $C_6$-$C_{14}$ α-olefins under polymerization conditions with the bis-biphenylphenoxy catalyst of formula (VI), and forming a polymer (i.e., a $C_6$-$C_{14}$ α-olefin homopolymer, a $C_6$-$C_{14}$ α-olefin copolymer, or a $C_6$-$C_{14}$ α-olefin terpolymer). The polymer (i.e., the $C_6$-$C_{14}$ α-olefin homopolymer, the $C_6$-$C_{14}$ α-olefin copolymer, or the $C_6$-$C_{14}$ α-olefin terpolymer) has one, some, or all of the following properties:

(i) a $Mw_{(Abs)}$ from greater than 1,300,000 g/mol to 12,000,000 g/mol, or from 1,400,000 g/mol to 10,000,000 g/mol, or from 1,400,000 g/mol to 9,000,000 g/mol, or from 1,500,000 g/mol to 8,000,000 g/mol; and/or (ii) a $Mw_{(Abs)}/Mn_{(Abs)}$ from 1.3 to 3.0, or from 1.4 to 2.9, or from 1.5 to 2.8, or from 2.1 to 2.7, or from 2.2 to 2.6; and/or (iii) a residual amount of zirconium, or from greater than 0 ppm, or 1 ppm to less than 300 ppm, or from 10 ppm to 200 ppm, or from 15 ppm to 180 ppm, or from 20 ppm to 170 ppm, or from 30 ppm to 160 ppm zirconium (hereafter Polymer1).

In an embodiment, the zirconium is present in the polymer composed of one or more $C_6$-$C_{14}$ α-olefins (Polymer1) to the exclusion of titanium. In a further embodiment, the polymer composed of one or more $C_6$-$C_{14}$ α-olefins (Polymer1) contains from 0 ppm to less than 10 ppm titanium.

In an embodiment, the one or more $C_6$-$C_{14}$ α-olefin is one or more $C_6$-$C_8$ α-olefin and the resultant polymer from polymerization of one or more $C_6$-$C_8$ α-olefin is a hexene homopolymer, a heptene homopolymer, an octene homopolymer, a hexene/heptene copolymer, a hexene/octene copolymer, a heptene/octene copolymer, or a hexene/heptene/octene terpolymer. The polymer composed of one or more $C_6$-$C_8$ α-olefin monomers contains a residual amount of zirconium and has one, some, or all of the following properties:

(i) a $Mw_{(Abs)}$ from greater than 1,300,000 g/mol to 12,000,000 g/mol, or from 1,400,000 g/mol to 10,000,000 g/mol, or from 1,400,000 g/mol to 9,000,000 g/mol, or from 1,500,000 g/mol to 8,000,000 g/mol; and/or (ii) $Mw_{(Abs)}/Mn_{(Abs)}$ from 1.3 to 3.0, or from 1.4 to 2.9, or from 1.5 to 2.8, or from 2.1 to 2.7, or from 2.2 to 2.6; and/or (iii) a residual amount of zirconium, or from greater than 0 ppm, or 1 ppm to less than 300 ppm, or from 10 ppm to 200 ppm, or from 15 ppm to 180 ppm, or from 20 ppm to 170 ppm, or from 30 ppm to 160 ppm zirconium (hereafter Polymer2).

In an embodiment, the zirconium is present in the polymer composed of one or more $C_6$-$C_8$ α-olefins (Polymer2) to the exclusion of titanium. In a further embodiment, the polymer composed of one or more $C_6$-$C_8$ α-olefins (Polymer2) contain from 0 ppm to less than 10 ppm titanium.

In an embodiment, the $C_6$-$C_{14}$ α-olefin is octene monomer and the resultant polymer from polymerization of octene monomer with the catalyst of formula (V) is octene homopolymer. The octene homopolymer has one, some, or all of the following properties:

(i) a $Mw_{(Abs)}$ from greater than 1,300,000 g/mol to 12,000,000 g/mol, or from 1,400,000 g/mol to 10,000,000 g/mol, or from 1,400,000 g/mol to 9,000,000 g/mol, or from 1,500,000 g/mol to 8,000,000 g/mol; and/or (ii) a $Mw_{(Abs)}/Mn_{(Abs)}$ from 1.3 to 3.0, or from 1.4 to 2.9, or from 1.5 to 2.8, or from 2.1 to 2.7, or from 2.2 to 2.6; and/or (iii) a residual amount of zirconium, or from greater than 0 ppm, or 1 ppm to less than 300 ppm, or from 10 ppm to 200 ppm, or from 15 ppm to 180 ppm, or from 20 ppm to 170 ppm, or from 30 ppm to 160 ppm zirconium; and/or (iv) a residual amount of germanium, or from greater than 0 ppm, or 1 ppm to less than 300 ppm, or from 10 ppm to 200 ppm, or from 12 ppm to 150 ppm, or from 14 ppm to 130 ppm, or from 14 ppm to 125 ppm germanium (hereafter Polymer3).

In an embodiment, the germanium and/or the zirconium is present in the octene homopolymer (Polymer3) to the exclusion of titanium. In a further embodiment, the octene homopolymer (Polymer3) contains from 0 ppm to less than 10 ppm titanium.

In an embodiment, the $C_6$-$C_{14}$ α-olefin is hexene monomer and the resultant polymer from polymerization of hexene monomer with the catalyst of formula (V) is hexene homopolymer. The hexene homopolymer has one, some, or all of the following properties:

(i) a $Mw_{(Abs)}$ from greater than 1,300,000 g/mol to 12,000,000 g/mol, or from 1,400,000 g/mol to 10,000,000 g/mol, or from 1,400,000 g/mol to 9,000,000 g/mol, or from 1,500,000 g/mol to 8,000,000 g/mol; and/or (ii) a $Mw_{(Abs)}/Mn_{(Abs)}$ from 1.3 to 3.0, or from 1.4 to 2.9, or from 1.5 to 2.8, or from 2.1 to 2.7, or from 2.2 to 2.6; and/or (iii) a residual amount of zirconium, or from greater than 1 ppm to less than 300 ppm, or from 10 ppm to 200 ppm, or from 15 ppm to 180 ppm, or from 20 ppm to 170 ppm, or from 30 ppm to 160 ppm zirconium; and/or (iv) a residual amount of germanium, or from greater than 0 ppm, or 1 ppm to less than 300 ppm, or from 10 ppm to 200 ppm, or from 12 ppm to 150 ppm, or from 14 ppm to 130 ppm, or from 14 ppm to 125 ppm germanium (Polymer4).

In an embodiment, the germanium and/or the zirconium is present in the hexene homopolymer (Polymer4) to the exclusion of titanium. In a further embodiment, the hexene homopolymer (Polymer4) contains from 0 ppm to less than 10 ppm titanium.

2. Liquid Carrier

In addition to the polymer composed of one or more $C_6$-$C_{14}$ α-olefin monomers (the polymer with $Mw_{(Abs)}$ greater than 1,300,000 g/mol, $Mw_{(Abs)}/Mn_{(Abs)}$ from 1.3 to 3.0 and residual amount of zirconium), the drag reducing agent also includes a liquid carrier. The polymer is dispersed in, or otherwise dissolved in, the liquid carrier.

The liquid carrier is selected (i) to disperse the polymer as a gel, a suspension, or a slurry or (ii) dissolve the polymer.

In an embodiment, the liquid carrier is a hydrocarbon. Nonlimiting examples of suitable hydrocarbons include aromatic hydrocarbons and aliphatic hydrocarbons, and combinations thereof. A nonlimiting example of a suitable aromatic hydrocarbon is toluene.

In an embodiment, the liquid carrier is an aliphatic hydrocarbon. The aliphatic hydrocarbon is a linear, branched, or ringed $C_4$-$C_{16}$, or $C_6$-$C_{12}$ aliphatic hydrocarbon. Nonlimiting examples of suitable aliphatic hydrocarbon solvents include butane, pentane, hexane, heptane, octane, nonane, decane, undecane, dodecane, tridecane, tetradecane, pentadecane, hexadecane, and combinations thereof.

In an embodiment, the liquid carrier is a paraffinic solvent such as Isopar™ solvents sold by Exxon-Mobil. Nonlimiting examples of suitable paraffinic solvent include Isopar™ E and Isopar™ L.

3. Drag Reducing Agent

In an embodiment, the drag reducing agent includes:
(A) from 10 wt % to 80 wt % of the polymer composed of one or more $C_6$-$C_{14}$ α-olefin monomers (the polymer with $Mw_{(Abs)}$ greater than 1,300,000 g/mol, $Mw_{(Abs)}$/$Mn_{(Abs)}$ from 1.3 to 3.0 and residual amount of zirconium (Polymer1); and
(B) from 20 wt % to 90 wt % of the liquid carrier.

In an embodiment, the drag reducing agent includes
(A) from 10 wt % to 80 wt %, or from 25 wt % to 45 wt % of octene homopolymer, the octene homopolymer having one, some, or all of the following properties:
(i) a $Mw_{(Abs)}$ from greater than 1,300,000 g/mol to 12,000,000 g/mol, or from 1,400,000 g/mol to 10,000,000 g/mol, or from 1,400,000 g/mol to 9,000,000 g/mol, or from 1,500,000 g/mol to 8,000,000 g/mol; and/or
(ii) a $Mw_{(Abs)}$/$Mn_{(Abs)}$ from 1.3 to 3.0, or from 1.4 to 2.9, or from 1.5 to 2.8, or from 2.1 to 2.7, or from 2.2 to 2.6; and/or
(iii) a residual amount of germanium, or from greater than 0 ppm, or 1 ppm to less than 300 ppm, or from 10 ppm to 200 ppm, or from 12 ppm to 150 ppm, or from 14 ppm to 130 ppm, or from 14 ppm to 125 ppm germanium; and/or
(iv) a residual amount of zirconium, or from greater than 0 ppm, or 1 ppm to less than 300 ppm, or from 10 ppm to 200 ppm, or from 15 ppm to 180 ppm, or from 20 ppm to 170 ppm, or from 30 ppm to 160 ppm zirconium (Polymer3);
(B) from 20 wt % to 90 wt %, or from 75 wt % to 55 wt % liquid carrier that is an aliphatic hydrocarbon; and the drag reducing agent has:
(i) a viscosity from $2.9014*10^{+05}$ m-Pas to $3.573*10^{+07}$ m-Pas.

In an embodiment, the drag reducing agent includes:
(A) from 10 wt % to 80 wt %, or from 25 wt % to 45 wt % of hexene homopolymer, the hexene homopolymer having one, some, or all of the following properties:
(i) a $Mw_{(Abs)}$ from greater than 1,300,000 g/mol to 12,000,000 g/mol, or from 1,400,000 g/mol to 10,000,000 g/mol, or from 1,400,000 g/mol to 9,000,000 g/mol, or from 1,500,000 g/mol to 8,000,000 g/mol; and/or
(ii) a $Mw_{(Abs)}$/$Mn_{(Abs)}$ from 1.3 to 3.0, or from 1.4 to 2.9, or from 1.5 to 2.8, or from 2.1 to 2.7, or from 2.2 to 2.6; and/or
(iii) a residual amount of germanium, or from greater than 0 ppm, or 1 ppm to less than 300 ppm, or from 10 ppm to 200 ppm, or from 12 ppm to 150 ppm, or from 14 ppm to 130 ppm, or from 14 ppm to 125 ppm germanium; and/or
(iv) a residual amount of zirconium, or from greater than 0 ppm, or 1 ppm to less than 300 ppm, or from 10 ppm to 200 ppm, or from 15 ppm to 180 ppm, or from 20 ppm to 170 ppm, or from 30 ppm to 160 ppm zirconium (Polymer4);
(B) from 20 wt % to 90 wt %, of from 75 wt % to 55 wt % liquid carrier that is an aliphatic hydrocarbon; and the drag reducing agent has a viscosity from $2.9014*10^{+05}$ m-Pas to $3.573*10^{+07}$ m-Pas.

By way of example, and not limitation, some embodiments of the present disclosure will now be described in detail in the following Examples.

EXAMPLES

The catalysts used in the comparative samples (CS) and in the inventive examples (1E) are provided in Table 1 below.

TABLE 1

| Comparative Catalyst | Inventive Catalysts |
|---|---|
| Ziegler-Natta Catalyst (ZN) BuEtMg, MgCl$_2$, Ti(OiPr)$_4$ 3 Ti:40 Mg:12 Al | Bis-biphenylphenoxy catalyst ("BBP") formula (V) BBP1 |

Zirconium,[[2,2'''-[[bis[1-methylethyl)germylene]bis(methyleneoxy-.kappa.O)]bis[3'',5,5''-tris(1,1-dimethylethyl)-5'-octyl[1,1':3',1''-terphenyl]-2'-olato-κO]](2-)]dimethyl-
CAS 958647-88-6
Bis-biphenylphenoxy catalyst BBP 2
formula (VI)

TABLE 1-continued

| Comparative Catalyst | Inventive Catalysts |
|---|---|
| | Zirconium,dimethyl[[2,2'''-[1,3-propanediylbis(oxy-κO)]bis[3'',5,5''-tris(1,1-dimethylethyl)-5'-methyl[1,1':3',1''-terphenyl]-2'-olato-κO]](2-)]-, CAS 958647-88-6; CAS 1001417-33-9 |

A. Polymerization of 1-hexene and 1-octene

For comparative sample 1 (CS1), polymerization is conducted with a Ziegler-Natta catalyst (ZN), in a 40 mL vial charged with 4 mL 1-octene and 8 mL solvent (Isopar E), 4 μmol catalyst (ZN), and 5 eq. of $Et_3Al$ (as an activator), for a period of twelve hours and at a temperature of 23-25° C. Then, solvent is removed under a vacuum.

CS2 was polymerized in the same manner as CS1 but the solution temperature was kept at −35° C. for a period of 48 hours during the polymerization.

For inventive examples 1~4 (IE1-4), polymerization is conducted with a bis-biphenylphenoxy catalyst (BBP1) in a 40 mL vial charged with 8 mL 1-octene and 12 mL Isopar-E (in Isopar E), 4 μmol catalyst, (BBP1) and 1.2 eq. RIBS-2 $(R_2N(H)Me\ B(C_6F_5)_4$, wherein R is hydrogenated tallowalkyl $(C_{14-18}alkyl)$(CAS number 200644-82-2) as an activator), for a period of twelve hours and at a temperature of 23-25° C. Then, solvent is removed under a vacuum.

For inventive example 5 (IE5), polymerization is conducted with a bis-biphenylphenoxy catalyst (BBP2) in a 40 mL vial charged with 8 mL 1-octene and 12 mL Isopar-E (in Isopar E), 4 μmol catalyst (BBP2), and 1.2 eq. RIBS-2 $(R_2N(H)Me\ B(C_6F_5)_4$, wherein R is hydrogenated tallowalkyl $(C_{14-18}alkyl)$(CAS number 200644-82-2) as an activator), for a period of twelve hours and at a temperature of 23-25° C. Then, solvent is removed under a vacuum.

For inventive example 6 (IE6), polymerization is conducted with a bis-biphenylphenoxy catalyst (BBP1) in a 40 mL vial charged with 8 mL 1-hexene and 12 mL Isopar-E, 1-4 μmol catalyst (BBP1), and 1.2 eq. RIBS-2 $(R_2N(H)Me\ B(C_6F_5)_4$, wherein R is hydrogenated tallowalkyl $(C_{14-18}alkyl)$(CAS number 200644-82-2) as an activator), for a period of twelve hours and at a temperature of 23-25° C. Then, solvent and unreacted hexene isomers are removed under a vacuum.

The properties of the resulting $C_6$-$C_8$ α-olefin homopolymers are provided in Table 2 below.

TABLE 2

| Sample | monomer Source | Polymerization Catalyst | Mw (Abs) (g/mol) | Mn (Abs) (g/mol) | Mw (Abs)/Mn (Abs) | Residual Catalyst Metal[1] | Residual Germanium[1] |
|---|---|---|---|---|---|---|---|
| CS1 | 1-Octene in Isopar E | ZN | 1,713,128 | 205,888 | 8.32 | 22 ppm Ti | — |
| CS2[2] | 1-Octene in Isopar E | ZN | 3,489,892 | 415,619 | 8.40 | 37 ppm Ti | — |
| IE1 | 1-Octene in Isopar E | BBP 1 | 3,613,644 | 2,339,626 | 1.54 | 42 ppm Zr | 34 ppm Ge |
| IE2 | 1-Octene in Isopar E | BBP 1 | 4,560,503 | 2,507,790 | 1.82 | 20 ppm Zr | 16 ppm Ge |
| IE2 | 1-Octene in Isopar E | BBP 1 | 5,430,769 | 2,957,812 | 1.84 | 35 ppm Zr | 28 ppm Ge |
| IE4 | 1-Octene in Isopar E | BBP 1 | 6,996,782 | 3,402,438 | 2.06 | 17 ppm Zr | 14 ppm Ge |
| IE5 | 1-Octene in Isopar E | BBP 2 | 2,243,290 | 1,070,812 | 2.09 | 44 ppm Zr | — |
| IE6 | 1-Hexene in Isopar-E | BBP 1 | 1,748,106 | 1,122,559 | 1.56 | 90 ppm Zr | 72 ppm Ge |

[1]ppm residual catalyst metal present in homopolymer, based on the total weight of the homopolymer
[2]Polymerization was carried out at −35° C..

Drag Reduction Tests

Figure 1:
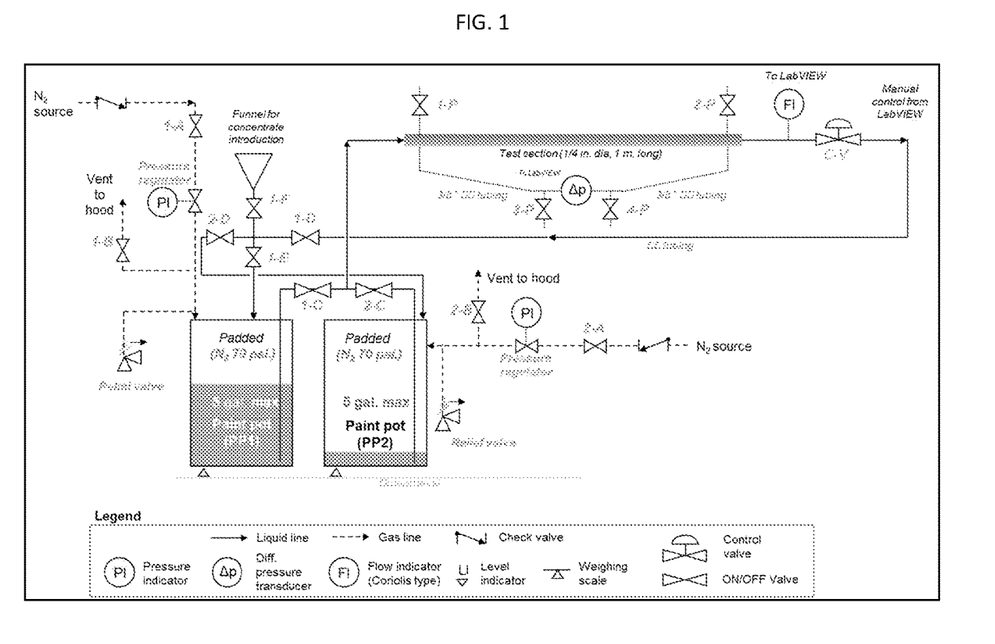
FIG. 1 is a schematic representation of the experimental set-up for evaluating drag reduction in accordance with an embodiment of the present disclosure.
Figure 2:
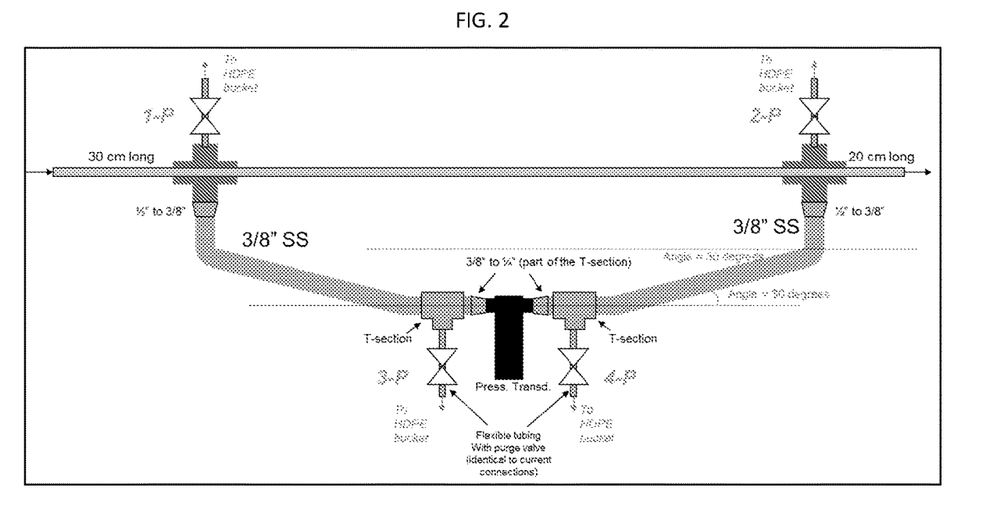
FIG. 2 is a schematic representation of a pressure measurement assembly used for determining the effectiveness of drag reducing agents, in accordance with an embodiment of the present disclosure.
Figure 3:
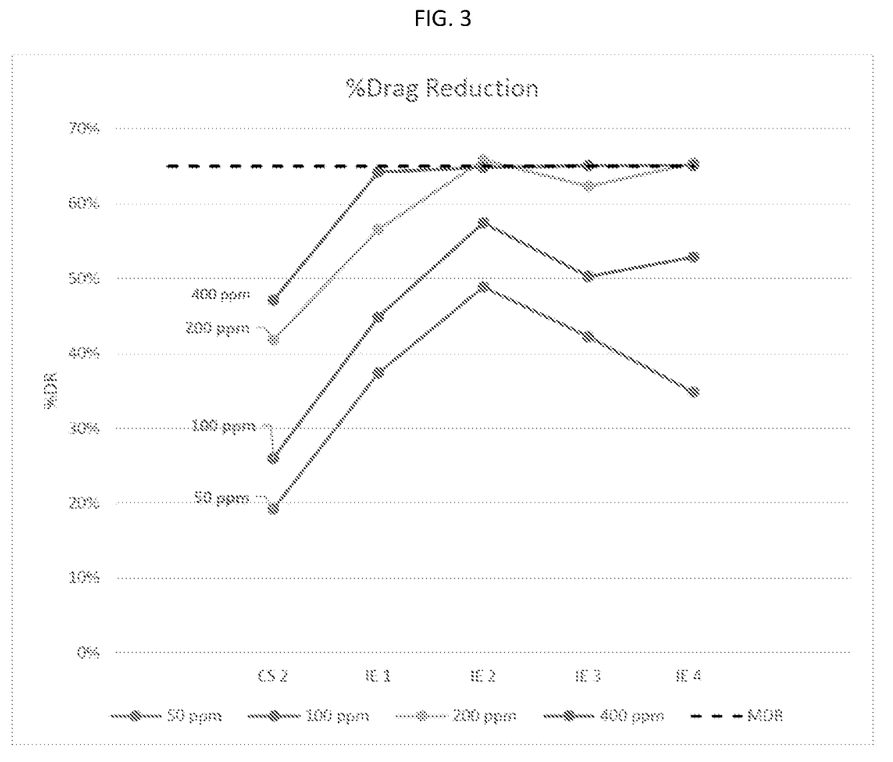
FIG. 3 is a graph showing quantitative comparisons of the drag reducing performance of each drag reducing agent, represented in terms of percent drag reduction (% DR).

The drag reducing performance for the drag reducing agent was evaluated using the experimental set-up shown in FIG. 1 and in FIG. 2.

Drag reduction for drag reducing agents is evaluated using a one meter long, 0.25 inch diameter stainless steel tubing or "test section." The flow rate (Q) through the tubing test section is measured using a Coriolis flow meter downstream of the test section, and the pressure drop (ΔP) is measured using a differential pressure transducer across the length of the tubing test section. A schematic representation of the configuration for the test section is shown in FIG. 1.

The flow loop conducts the fluid between two pressure vessels or "paint pots" (PP1 and PP2). The liquid motion is generated by a pressure differential applied between the two paint pots that is set using nitrogen gas at ~70-80 prig. The valve assembly, shown in FIG. 1, is such that the fluid can be shuttled back and forth between PP1 and PP2 without requiring any line or equipment opening. Also, in both back and forth operations, the liquid travels through the test section in the same direction (left to right in FIG. 1) allowing for consistent ΔP measurements.

Each paint pot is fitted with a vent valve, a pressure gauge, a pressure regulator, and a relief valve. The nitrogen gas is kept at a positive gauge pressure in both paint pots to preclude any concerns associated with flammable and combustible materials. The full setup is placed inside a fume hood for added safety. Further, PP1 is fitted with a funnel assembly that is utilized to introduce liquids in the setup without requiring line or equipment opening.

Pressure drop across the length of the test section is measured using a wet-wet differential pressure transducer (Omega PX459-050DWUI). The transducer is connected to the pressure taps at the two ends of the test section (1 m apart) using ⅜" diameter S.S. tubing—schematic of the full assembly is shown in FIG. 2. The pressure taps (blue crosses) are specially designed so as not to disrupt the structure of the turbulent boundary layer which is essential to obtain accurate measurements of the friction factor, key to quantifying drag reduction performance. The ⅜ inch connections to the pressure transducer are bent at 30° to the horizontal so as to prevent bubble accumulation in the lines, and to allow for easy draining of the lines via valves 3-P and 4-P. Valves 1-P and 2-P are used to degas the pressure taps after the lines are flooded for the first time (before the first run).

Flow rate of the liquid is measured using a Coriolis flow transducer (MicroMotion CMF050) that is placed downstream of the test section. A control valve is used to limit the flow rate for each run. Ideally, this setup can be used in concert with LabVIEW to accurately regulate the flow rate to a setpoint value. Opening of the control valve was manually set by the user using LabVIEW software and an automated flow control feedback loop was not utilized.

The tests were conducted in an organic liquid carrier (to mimic the hydrophobicity of crude oil). The organic liquid carrier has a lower viscosity than crude oil to be able to attain high enough flow rates (Reynolds numbers) in the test section such that flow could lie in the fully turbulent regime. As a result, Isopar L (Exxon Mobil ISOPAR™ L FLUID) was chosen as the solvent (and further mimics hydrophobicity of crude oil). Polyoctene samples synthesized in vials were premixed in Isopar L, using heat and stirring to accelerate dissolution, to prepare concentrate solutions. Drag reduction measurements were carried out at polymer concentrations ranging from 10 ppm to 400 ppm; these solutions were prepared by initially taking 2 gallons of Isopar L in the setup and adding the polymer concentrate solutions to it in increasing amounts. Drag reduction measurements were carried out for water and pure Isopar L (validation) and four solutions of each polyoctene.

Results and Discussion

Drag reducing measurements were conducted using homopolymer in Isopar L at concentrations of 10, 20, 50, 100, 200, and 400 ppm.

Figure 4:
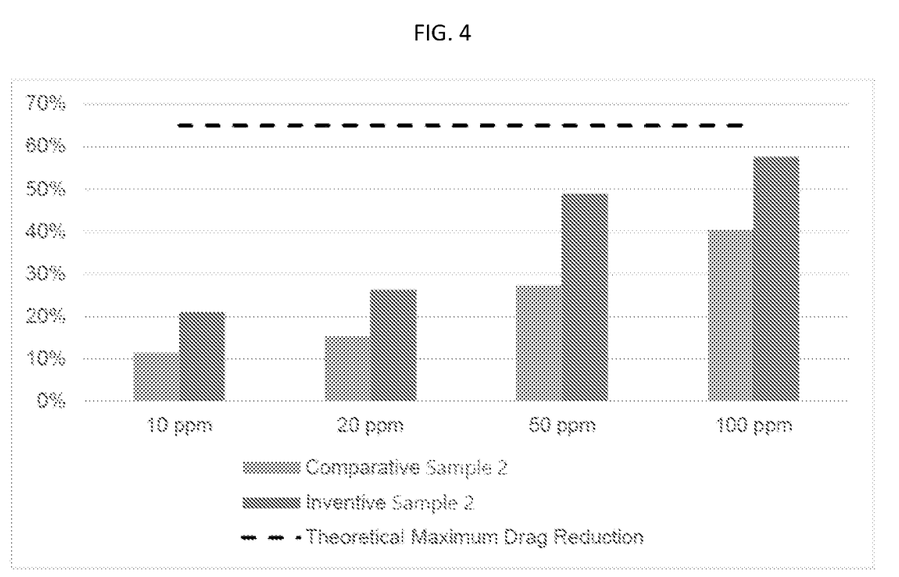
FIG. 4 is a graph showing a comparison of percent drag reduction between broad molecular weight distribution (MWD) octene homopolymer and narrow MWD octene homopolymer at high molecular weight.

FIG. 4 shows a comparison of broad MWD (Comparative Sample 2) with narrow MWD (Inventive Example 2) at a higher MW. Here the deviations are visibly larger; the narrow MWD polyoctene of 1E2 consistently outperforms the broad MWD polyoctene of CS2 by a large margin—around 84% at 10 ppm, 72% at 20 ppm, 79% at 50 ppm, and 42% at 100 ppm.

Drag reduction performance. Table 3 shows % drag reduction (65% theoretical maximum drag reduction).

TABLE 3

Percent drag reduction in flow loop system at various polyoctene or polyhexene dosages.

| | CS 1 | CS 2 | IE 1 | IE 2 | IE 3 | IE 4 | IE 5 | IE 6 |
|---|---|---|---|---|---|---|---|---|
| 10 ppm DRA | — | 11% | — | 21% | — | — | 7% | — |
| 20 ppm DRA | — | 15% | — | 26% | — | — | 10% | — |
| 50 ppm DRA | 19% | 27% | 37% | 49% | 42% | 35% | 17% | 11% |
| 100 ppm DRA | 26% | 40% | 45% | 57% | 50% | 53% | 24% | 17% |
| 200 ppm DRA | 42% | — | 57% | 66% | 62% | 65% | — | — |
| 400 ppm DRA | 47% | — | 64% | 65% | 65% | 65% | — | — |

In all cases the drag reducing agents produced using BBP catalysts (BBP1/BBP2) performed well as drag reducing agents and consistently outperformed drag reducing agents made with Ziegler-Natta catalysts. At the same molecular weight polyoctene and/or polyhexene with narrow molecular weight distribution (IE 1-6) outperformed broad molecular weight distribution and polyoctene comparative samples (CS 1-2).

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A drag reducing agent comprising:
   from 10 wt % to 80 wt % of a polymer consisting of (i) one or more $C_6$-$C_{14}$ α-olefin monomers, and (ii) a residual amount of a component selected from the group consisting of zirconium, germanium, boron, and combinations thereof, the polymer having an absolute weight average molecular weight ($Mw_{(Abs)}$) greater than 1,300,000 g/mol and a $Mw_{(Abs)}/Mn_{(Abs)}$ from 1.3 to 3.0; from 20 wt % to 90 wt % of a liquid carrier; and the drag reducing agent has a viscosity at 100° C. from $2.9014*10^{+05}$ m-Pas to $3.573*10^{+07}$ m-Pas.

2. The drag reducing agent of claim 1 wherein the polymer has 0 ppm titanium.

3. The drag reducing agent of claim 1 wherein the polymer has from greater than 0 ppm to 300 ppm zirconium.

4. The drag reducing agent of claim 1 wherein the polymer has from greater than 0 ppm to 300 ppm germanium.

5. The drag reducing agent of claim 1 wherein the polymer is selected from the group consisting of octene homopolymer and hexene homopolymer.

6. The drag reducing agent of claim 1 wherein the liquid carrier is selected from the group consisting of a linear $C_4$-$C_{16}$ aliphatic hydrocarbon, a branched $C_4$-$C_{14}$ aliphatic hydrocarbon, a ringed $C_4$-$C_{16}$ aliphatic hydrocarbon, and combinations thereof.

7. The drag reducing agent of claim 6 wherein the polymer contains zirconium and boron.

8. The drag reducing agent of claim 7 wherein the polymer contains germanium.

* * * * *